INVENTORS.
WILLIAM J. LANGEVIN, JR.
DONALD R. LANGEVIN
BY LLOYD P. LANGEVIN

Kenwood Ross

ATTORNEY.

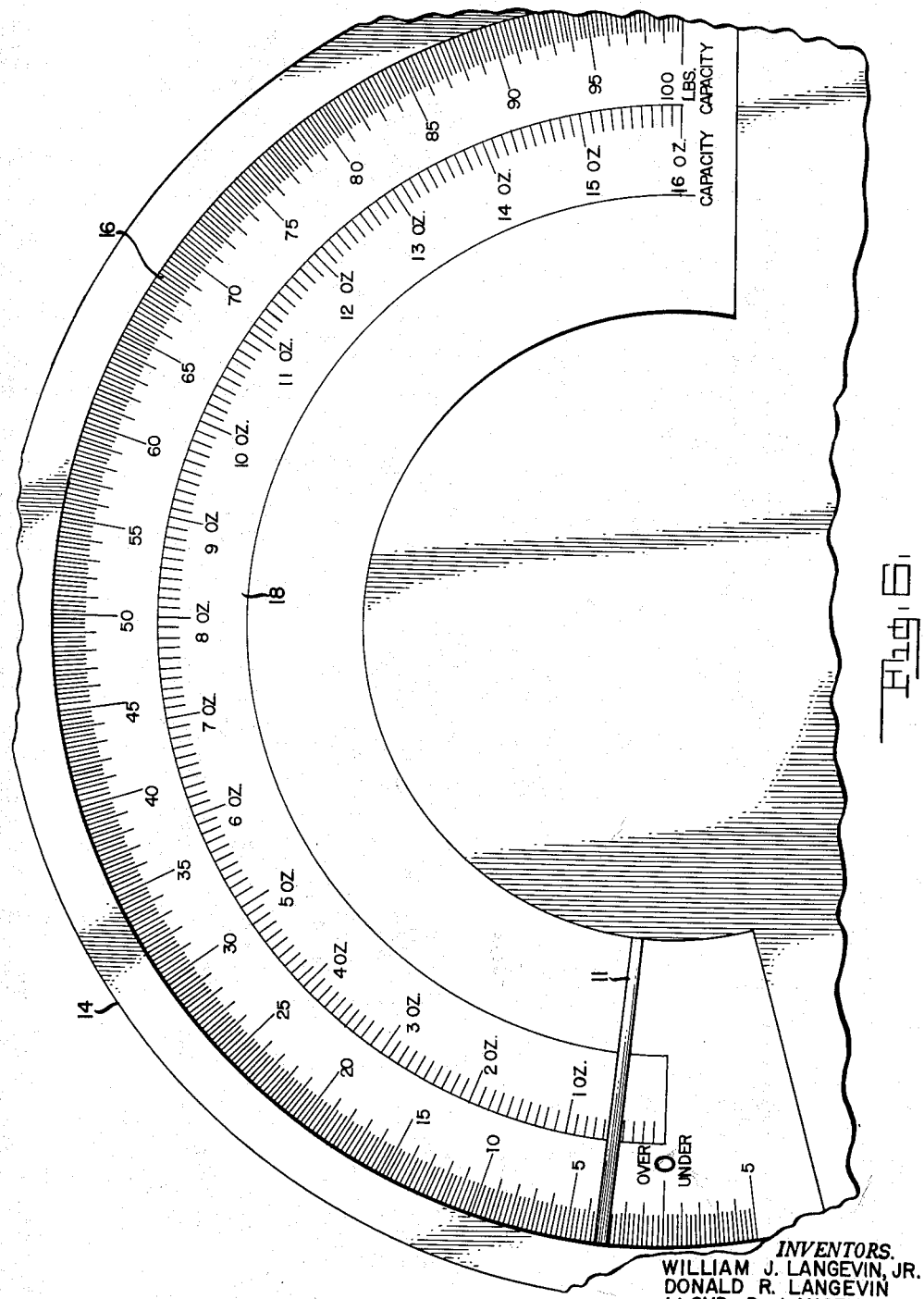

United States Patent Office 3,072,206
Patented Jan. 8, 1963

3,072,206
SCALE
William J. Langevin, Jr., North Miami Beach, Fla., Donald R. Langevin, Feeding Hills, Mass., and Lloyd P. Langevin, North Miami Beach, Fla., assignors to National Scale Company, Springfield, Mass., a corporation
Filed Dec. 6, 1960, Ser. No. 74,046
6 Claims. (Cl. 177—30)

The present invention relates generally to new and useful improvements and structural refinements in scales and is directed more particularly to the provision of an all-ratio type scale having general utility in the arts and more specifically to an improvement in the means for determining the number of articles for a given weight and also for determining the average weight of a single article when a certain number of said articles is introduced to the scale.

It will be helpful to an understanding of our invention to first briefly consider some of its more essential points and important features and aspects, so that same may be kept in mind during the subsequent reading of the detailed description of the practical embodiment of our improvements and of the illustration thereof in the hereunto annexed drawings.

The particular embodiment of the present invention, exemplified herein, embraces the concept of an all-ratio scale, wherein a scale of the variable ratio type, such as is used for counting articles by weight, is modified by the addition of a dial indicating means for determining the average weight of a predetermined number of articles.

The invention resides in the particular construction, arrangement, combination, and relationship of the various elements, components and instrumentalities of the apparatus, as exemplified in the detailed disclosure hereinafter set forth, wherein the below defined objects of the invention will be apparent.

The invention hereof has particular application in use by Post Office Department personnel for whom it may function as a "lie detector" in the sense that, in the mailing of large quantities of third class mail, where it is impractical to weigh every individual mailing piece, and where there may be a variance between the individual mailing pieces, the fact that all of the mailing pieces are or are not of the same weight may be readily and easily determined. The system hereof envisions the determining of the weight of one of said mailing pieces by way of weighing five of such pieces and taking a reading from a scale designed to register the weight of the said one mailing piece.

The apparatus hereof envisions the combination of a tare beam, a counting beam, a dial indicator, and a slidable ratio pan, with said dial indicator serving the dual purpose of indicating on one scale a total weight for determining a total number, and on an additional scale, the average weight of a certain number of articles placed in the ratio pan.

It is contemplated that the improved counting and weighing device hereof will be especially adaptable for use in operations where it is necessary to determine not only the number of articles represented by a certain weight, but also the average weight of these articles.

To make the manufacture of the scale a more profitable undertaking, the mechanism embodying the essence of the invention has been designed in such manner as to be simple in its construction, and inexpensive in its manufacture, the usual complexity of components having been so greatly reduced as to offer a compact design representative of a fundamentally new concept in the combining and coacting of component parts.

Further, while the components are uniquely compact and simple in construction, they are nevertheless readily accessible for maintenance and replacement purposes with a consequent reduction in maintenance costs over related devices heretofore known, all resulting in important distinct advantages in economy of manufacture, ease of operation, reliability of performance, and capability of ready assembly to provide positiveness and ease of manual control and action under the varying conditions of practical use.

Other of the chief objects and purposes hereof are to provide advantageous structural and operational features in a device of the class to which reference has been made so as to offer an apparatus having the following inherent meritorious characteristics: first engineeringwise, a uniqueness in design of coacting parts wherefor the components are coordinated for facile assembly; second, a susceptibility to easy installation, maintenance and repair; third, a high degree of efficiency and dependability in its operational use; fourth, the securement of a higher degree of accuracy and greater degree of variety in the manner of work performed therewith than has heretofore been possible with prior devices known in the art; fifth, the provision of a construction which is well adapted to withstand the usage to which a scale is ordinarily subjected, and sixth, the provision of such other improvements in and relating to scales of the type above referred to as are hereinafter described and claimed.

The characteristic features which we consider to be novel with our invention, as to its construction and organization and as to its method of operation, will be better understood from a consideration of the following detailed description forming a part of this specification, when read in conjunction with the illustrations in the accompanying drawings, wherein like characters of reference are employed to designate like or corresponding parts throughout the several views and in which:

FIGS. 5 and 6 are enlarged, fragmentary, elevational views of the counting beam and dial indicating means respectively.

Figure 1:
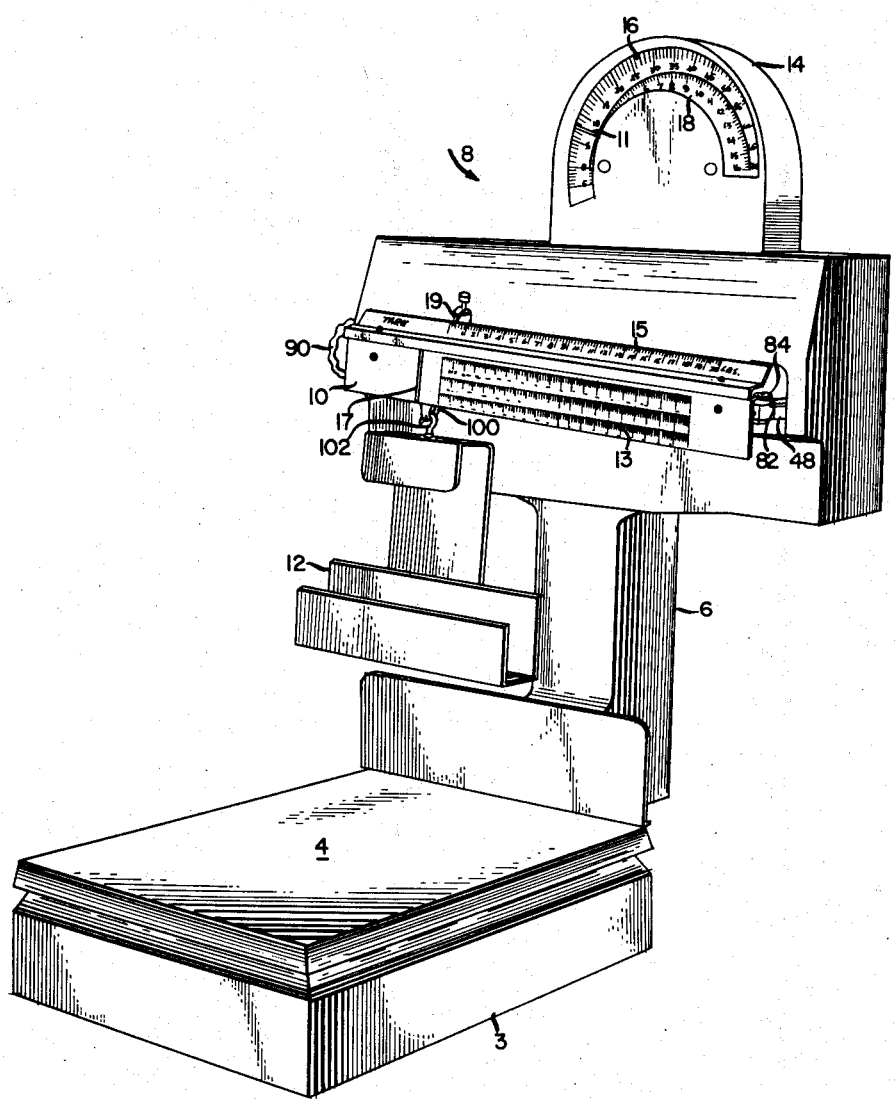
FIG. 1 is a view in perspective of a scale embodying the structure of our invention.

In the following description and in the appended claims, various components and details thereof will be identified by specific names for purposes of convenience. Such names, however, are intended to be generic in their application as the art will permit. The phraseology or terminology herein employed is for the purpose of description and not of limitation, there being no intention, in the use of such specific terms and expressions, of excluding any equivalents of the features shown and described or portions thereof, various modifications being recognized as entirely possible within the scope and spirit of the invention.

With continued reference now to the drawings, which illustrate a typical and preferred embodiment of the invention, for the purpose of disclosure, we have shown a platform scale comprising, in combination, a base 3, a platform or weight bridge 4, a pillar 6, and a head, generally indicated by 8, which head includes a combination counting and tare beam 10 of the variable ratio type having a ratio pan 12 suspended therefrom, and a dial indicating means 14 of the spring type and comprising an outer dial 16, graduated in pounds, an inner dial 18, graduated in ounces, and an indicating needle 11.

The counting and tare beam 10 has a main counting chart 13 and a tare chart 15 delineated thereon. Main counting chart 13 has an indicator needle 17 extending vertically across its face and being movable relative thereto and tare chart 15 has a movable pointer means 19 slidably associated therewith.

Said pointer means 19 may be manually moved along the counting and tare beam 10 to offset the weight of any container or sack which may be placed upon the platform or weight bridge 4.

The indicator needle 17 may be moved along and relative to the main counting chart 13, along with the ratio pan 12, for the purpose of determining the number of pieces placed upon the weight bridge or weighing platform, all in manner subsequently to be described.

In practice, a container of known weight is placed upon the weight bridge. The weight of the container per se is counteracted by manually sliding the pointer means 19 along the tare chart 15 of the counting and tare beam 10.

To count the number of articles in this container, a certain number of the articles is placed in the ratio pan 12, this number being determined by reference to the main counting chart 13 printed upon the counting and tare beam 10 wherein a certain number of articles will be placed in the ratio pan according to the estimated total number of articles in the container or sack resting upon the weight bridge.

The ratio pan 12 is then moved along the counting and tare beam 10 until the indicator needle 17 reaches a figure corresponding to the estimated total within the container.

If this estimated total corresponds to the actual number of articles in the container, the indicating needle 11 will register zero on the outer dial 16 of the dial indicating means 14. If the total is incorrect the indicating needle 11 will register over or under zero on said outer dial, same being dependent upon whether the estimate is over or under the total actually in the container.

To determine the average weight of the articles in the container, the ratio pan 12 is moved to the extreme left on the counting and tare beam 10, at which point the indicator needle 17 is completely divorced from the graduations printed on the main counting chart 13.

Further movement of the ratio pan to the left is precluded by contact of a pan carrier 21 with a zero pin 22 provided on a cross beam 24 to which the counting and tare beam 10 is attached.

A certain number of the articles from the container is now placed in the ratio pan, which becomes, in effect, a secondary platform. Again, the number of articles to be placed in the ratio pan is determined by reference to instructions printed upon the main counting chart 13.

Weight readings are now made on the inner dial 18 of the dial indicating means. In the present embodiment hereof, this inner dial is graduated in tenths of an ounce for each sixteen ounces.

Stated otherwise, if ten pieces are placed in the ratio pan, the inner dial will actually indicate the average weight of these ten pieces.

If two and one-half pounds of material were placed in the ratio pan, one-half pound would be indicated upon the inner dial 18.

Having thus described the basic principles involved in the practical uses of our improved all-ratio scale, its basic construction will now be described.

Figure 2:
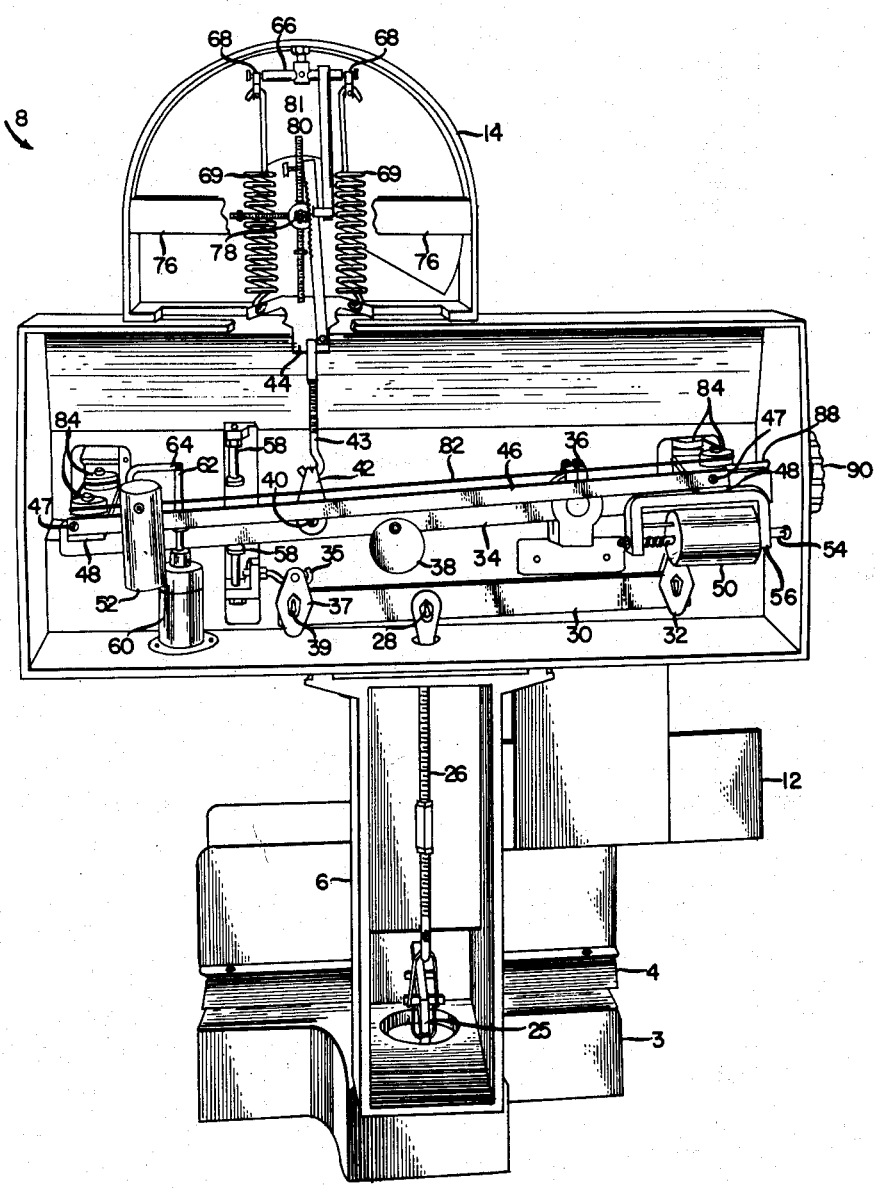
FIG. 2 is an elevational view taken from the rear of the apparatus as shown in FIG. 1.
Figure 3:
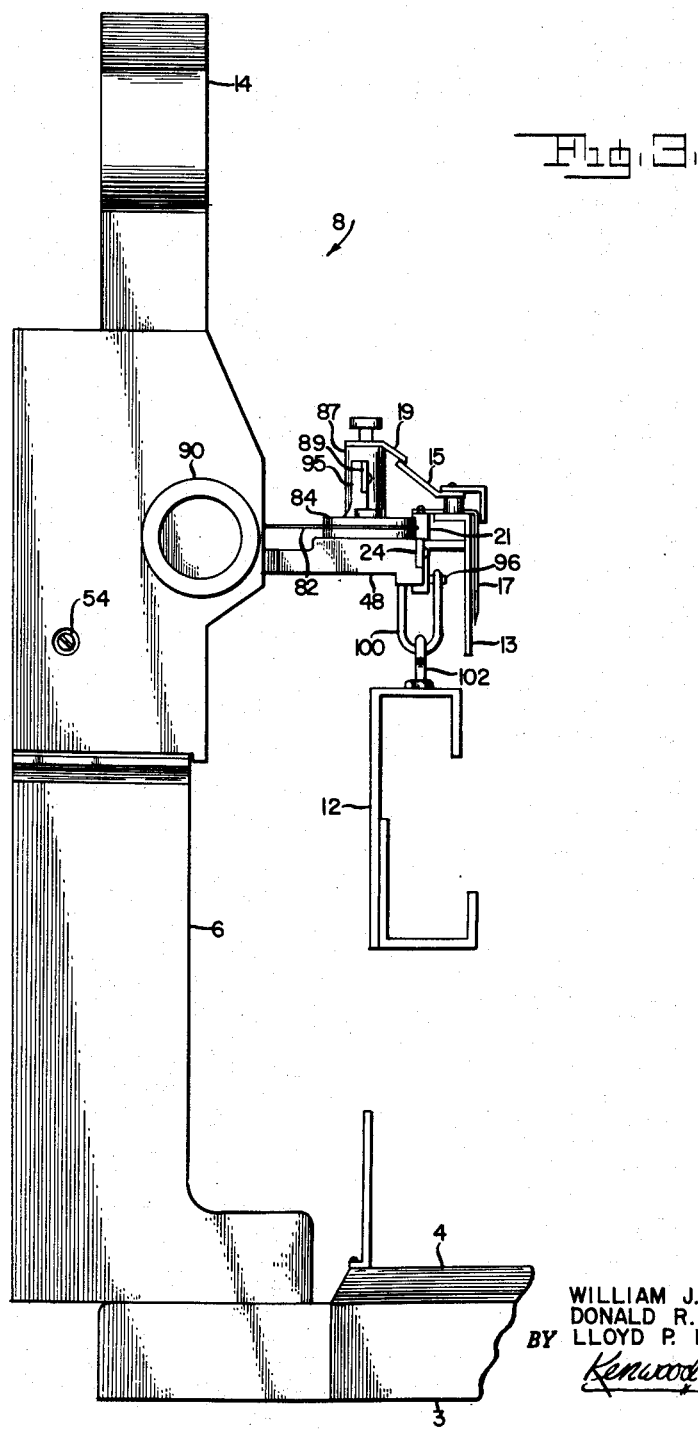
FIG. 3 is an enlarged, fragmentary, end elevational view taken from the left of the apparatus as shown in FIG. 1.

With particular reference to FIG. 2, it will be seen that a lower shelf lever 25 is horizontally suspended immediately above and readwardly of the base 3 within the pillar 6, between a long lever (not shown), disposed within the base, and a vertical steelyard rod 26, disposed within said pillar.

The weight of the load is transferred from the platform to the upper main beam of the scale through the long lever to the lower shelf lever through the steelyard rod.

The lower extremity of the steelyard rod is pivotally connected to said lower shelf lever 25 while its upper extremity is pivotally suspended from a beam pivot 28 which extends laterally through a generally horizontally-extending upper shelf lever 30.

The upper shelf lever 30 is pivotally connected at one end by means of a beam hook 32 to a generally horizontally-extending main beam 34, and is suspended at its other end from a balance hook 35 fixed to the frame and extending through a beam hook 37 mounted upon a beam pivot 39 extending through said shelf lever.

The main beam 34 is pivoted upon a fulcrum head or stand 36 and has a gravity ball 38 disposed thereon whereby the static mass and sensitivity of the beam may be controlled.

A beam tip pivot 40 extends laterally through the main beam 34 and has a beam hook 42 pivotally connected thereto. A tip loop 43, having a lower extremity extending through said beam hook, is suspended from a spring plate 44 leading to the spring mechanism, subsequently to be described, leading to the dial head.

An elongated, generally horizontally-extending cross bar 46 is fixed at its opposite extremities by screws 47 to a pair of trolley supports 48 extending transversely through the head. Said cross bar 46 is provided at one extremity with a balance ball 50 and at the other extremity with a counter balance ball 52.

The balance ball 50 is mounted upon a shaft 54 which extends through the arms of a bracket 56 depending from the cross bar 46 and the extremity of one of the trolley supports 48. The shaft 54 is provided at its outer free extremity with a groove or slot, of suitable size to accommodate a screw driver or the like, whereby the position of the balance ball 50 may be adjusted, it being understood that said balance ball serves the purpose of setting and maintaining the dial indicator at zero.

A pair of vertically aligned beam stops 58 are provided and serve to limit the vertical movements of the main beam, thereby precluding damage to the dial indicating mechanism when a large load is placed upon the scale platform.

The counter balance ball 52 serves to counter balance the combined weight of the ratio pan and trolley hereinafter to be more fully described.

A hydraulic dash-pot 60 is provided adjacent the counter balance ball 52 and is comprised of an upwardly extending shaft 62 pivotally connected to an L-shaped arm 64 fixed to the main beam 34, and serves to preclude any quivering of the dial mechanism.

The dial indicating means 14 includes a suspension bracket 66 fixed to the outer frame of the dial and having spring hangers 68 suspended from its opposing ends. These spring hangers support a pair of tension springs 69 which depend therefrom and extend to the spring plate 44 fixed to the tip loop 43 which in turn supports the main beam 34.

A rack and pinion arrangement, subsequently to be described, is linked to the indicating needle 11 which reflects various readings on the inner and outer dials 18 and 16 respectively. A horizontal cross brace 76 extends between the vertical side walls of the dial frame and has a pinion 78 extending laterally inwardly therefrom, said pinion having the indicating needle 11 affixed thereto.

A rack 80 extends generally vertically upwardly from the spring plate 44 and serves to drive the pinion as the main beam is moved.

A vertical retainer post 81 extending between the suspension bracket 66 and the base of the rack 80 serves to keep said rack and the pinion 78 in engagement.

Figure 4:
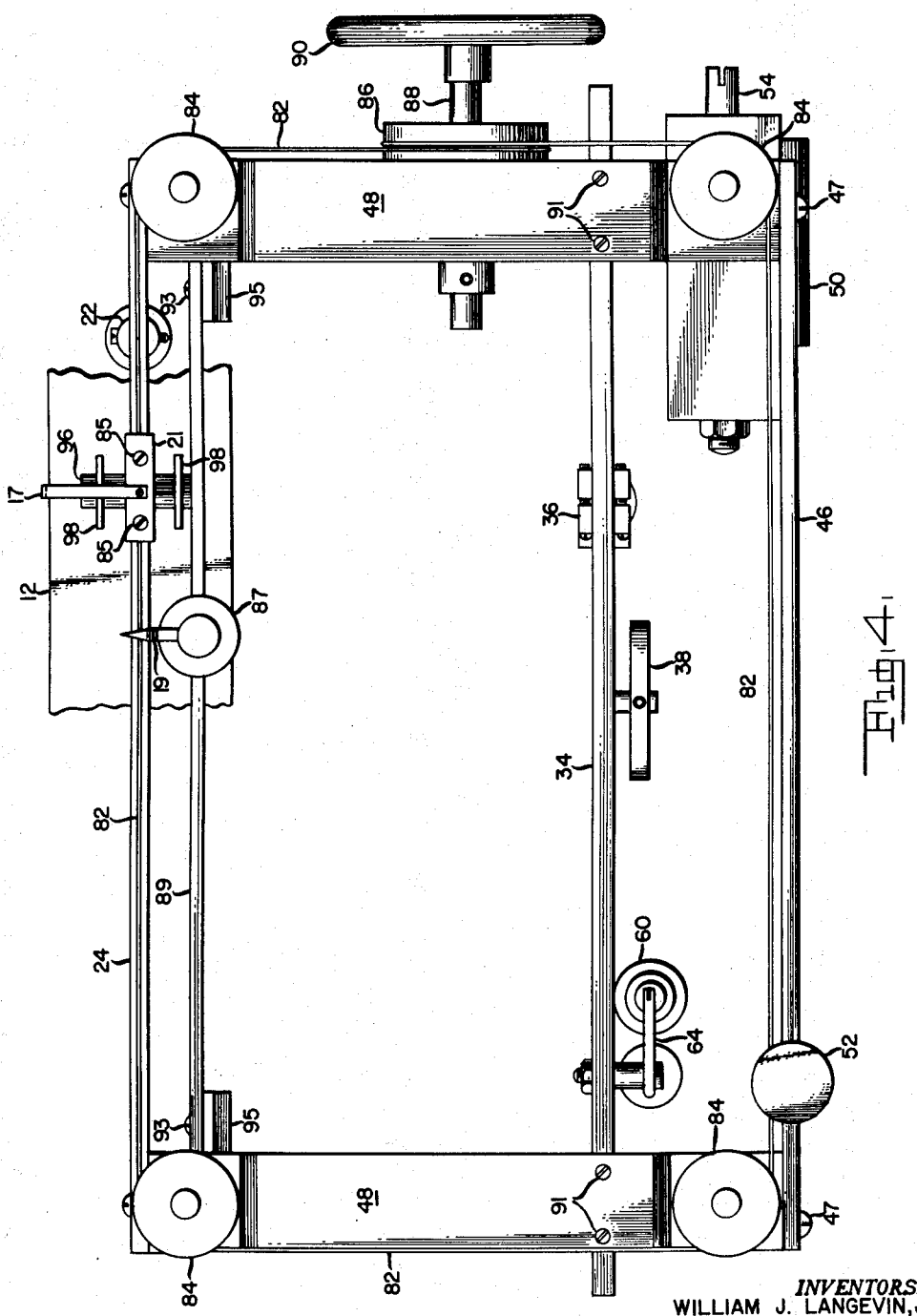
FIG. 4 is a diagrammatic plan view of the trolley means of the apparatus of the invention.
Figure 5:
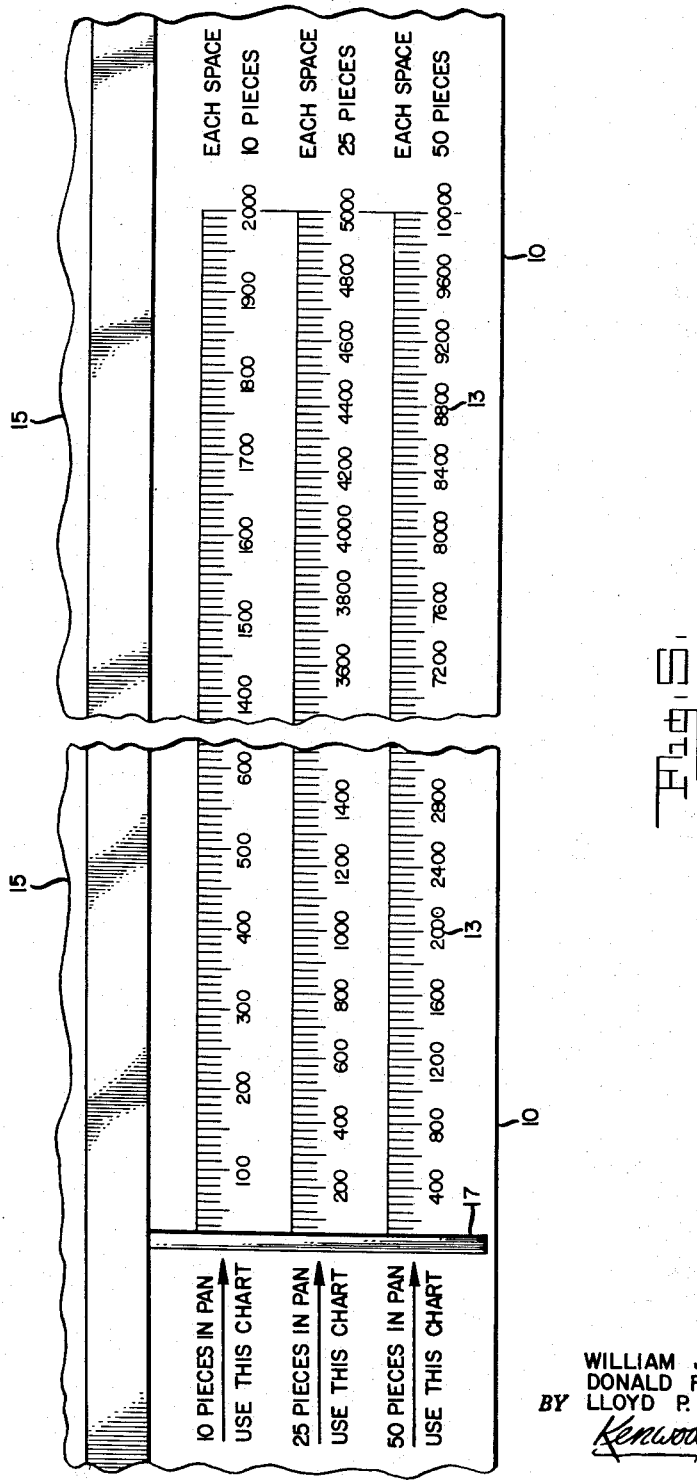

In the trolley means illustrated in FIG. 4, it will be seen that a cord or line 82 is passed around four annular revolving discs 84 fixed to the extremities of each of the trolley supports 48 and passes through the upper extremity of the pan carrier 21.

A pair of screws 85 extend downwardly through the upper end of the pan carrier 21 and abut the line 82 thereby fixing the carrier in position upon the line.

The line 82 is also passed around an annular disc 86 journalled upon a horizontally-extending shaft 88 fixed to a control knob 90 which is provided at the head of the scale and extends outwardly therefrom.

The trolley supports 48 are fixed to and extend between the substantially parallel cross beam 24 and cross bar 46 and are also fixed to the opposite ends of the main beam 34 as by downwardly extending screws or bolts 91 which pass through said supports and are threaded in the upper edges of the main beam.

The main beam 34 and the entire trolley assembly just described pivot upon the fulcrum head or stand 36.

The pointer means 19 is fixed to the upper extremity of a carrier 87 which is slideable upon a tare beam 89 extending between and fixed as by screws 93 to brackets 95 extending inwardly of and upwardly from the trolley supports 48.

A tip pivot 96 extends laterally through the pan carrier 21 adjacent the lower extremity thereof. The upper ends 98 of a beam hook 100 are pivoted upon the tip pivot 96 while a suspension hook 102 fixed to the ratio pan 12 is receivable in the lower end of the beam hook 100.

By rotation of the control knob 90, the ratio pan 12 and indicator needle 17 may be moved in a horizontal path along the counting beam, the ratio pan being suspended from the pan carrier 21 fixed to the line 82 as aforesaid.

From the foregoing, it will be seen that our novel device may be utilized as a weighing or dial scale wherein a load placed on the platform will give a direct reading on the outer dial 16 of the dial indicating means 14, or it may be utilized as a counting scale whereby a total number may be obtained by sliding the ratio pan outwardly along the main counting chart 13, or it may be used as an averaging scale, wherein the average weight of articles placed in the ratio pan may be determined by reading the inner dial 18 of the dial indicating means 14.

It is believed that the advantages and use of the invention will be clearly understood from the foregoing disclosure and accordingly, further description thereof at this point is considered unnecessary, as we have, in accordance with the provisions of the patent statutes, described the principle of operation of our invention together with the apparatus which we now believe to represent the best embodiment thereof.

The physical embodiment delineated, albeit the preferred exemplification, is only indicative of but one of the various ways in which the principles of the invention may be employed and in which the component parts may be combined and arranged. Same is submitted as one best known embodiment of the invention and is given with a view to illustrating and explaining the precise nature of the principles of the invention and their embodiment for practical use, in order that others skilled in the art to which the invention pertains may be enabled to adapt and modify them in numerous embodiments, variations and modifications, each as may be best adapted to the conditions of any particular use.

The invention is not restricted or confined to said embodiment and same is not intended to be exhaustive of, nor limiting of, the spirit or scope hereof. That is, the precise construction of the figures of the drawing need not be slavishly followed as, of course, the scale may have to be adapted or modified in accordance with any specific use contemplated therefor. Such adaptations and/or modifications should be and are intended to be comprehended within the meaning and purview and range of equivalence of the below subjoined claims, there being no intent to have this invention limited to or circumscribed by any specific details.

The objects of the invention are susceptible of attainment by use of constructions different in certain respects from that disclosed, such as minor changes and variations in size, shape, proportion, integration, cooperation of material, type of subassembly or accessory utilized, and the like, all without departing from the underlying principles, salient features, scope and spirit hereof.

The protection which is sought for this invention is covered by the scope of the appended claims, it being our intention to claim all novelty inherent in our invention as broadly as possible.

Accordingly, limitation hereof should only be made as determined by a proper interpretation of the subjoined claims.

We therefore particularly point out and distinctly claim as our invention:

1. An all-ratio scale comprising, in combination, a base, a weight bridge disposed upon said base, a pillar extending upwardly from said base, a head integral with and disposed at the upper extremity of said pillar, said head comprising, spaced, parallel, generally horizontally-extending tare and counting beams, indicating means integral with and slidable relative to said tare and counting beams, a ratio pan suspended below said counting beam, means for effectuating the longitudinal sliding movement of said ratio pan relative to said counting beam and, a spring dial indicator having inner and outer dial charts and an indicating needle common to each of said inner and outer dial charts, means linking said indicating needle to the main beam of said scale, said means including a rack movable with said beam and a pawl fixed to said needle and engageable with said rack, the movement of said rack being controlled by spring means within said head, whereby said dial indicator may indicate upon said outer dial chart the total weight of articles placed upon said weight bridge, and whereby said dial indicator may indicate upon said outer dial that the correct number of articles has been placed upon said weight bridge as indicated on said counting beam, and whereby said dial indicator may indicate upon said inner dial chart the average weight of articles placed upon said weight bridge.

2. In an all-ratio-scale as defined in claim 1 wherein said counting beam and said main beam are fixed to a trolley frame fulcrumed upon said head, whereby said trolley frame is linked to said indicating needle of said dial head and wherein said trolley frame is linked to said weight bridge.

3. In a scale for weighing, counting and indicating the average weight of articles placed thereon, comprising, in combination, a weight bridge, a counting beam fixed to a trolley frame linked to said weight bridge and having a ratio pan suspended therefrom and slidable relative thereto, a dial indicator comprising an inner dial chart, an outer dial chart and an indicating needle, means linking said indicating needle to said trolley frame including a rack fixed to a spring plate spring hung from said dial indicator and connected to said trolley frame, said rack being engageable with a pinion integral with said indicating needle and being movable as said trolley frame is moved whereby the total weight of articles placed on said weight bridge may be determined by reference to said outer dial chart, whereby the number of articles placed on said weight bridge above or below a certain total may be determined by reference to said outer dial chart by placing a certain number of said articles in said ratio pan, and sliding said ratio pan longitudinally along said counting beam in a certain direction, and whereby the average weight of articles placed on said weight bridge may be indicated on said inner dial chart by placing a certain number of said articles in said ratio pan and sliding said ratio pan longitudinally along said counting beam in a direction opposite to the said certain direction.

4. An all-ratio scale comprising in combination, a base, a weight bridge disposed upon said base, a main beam, a a pillar extending upwardly from said base, a head integral with the upper extremity of said pillar and including spaced parallel generally horizontally-extending tare and counting beams, indicating means integral with and slidable relative to the tare and counting beams of said head, a ratio pan suspended below the counting beam of said head, means for effectuating longitudinal sliding movement of said ratio pan relative to the counting beam and of said head, spring dial indicator means including inner and outer dial charts and an indicating needle common to each thereof, means linking the indicating needle of said indicator means to said main beam and including a rack movable with said main beam and a pawl fixed to the indicating needle of said indicator means and engageable with the rack, spring means within said head for controlling the movement of the rack whereby said dial indicator may indicate upon said outer dial chart the total weight of articles placed upon said weight bridge and whereby said dial indicator may signal upon said outer dial chart that the correct number of articles has been placed upon said weight bridge as indicated on the counting beam of said head and whereby said dial indicator may indicate upon said inner dial chart the average weight of articles placed upon said weight bridge.

5. In the all-ratio-scale as defined in claim 4 wherein, the counting beam of said head and main beam are fixed to a trolley frame fulcrumed upon said head with the trolley frame being linked to the indicating needle of said dial indicator and to said weight bridge.

6. In a scale for weighing and counting and indicating the average weight of articles placed thereon, comprising in combination, a weight bridge, a counting beam fixed to a trolley frame linked to said weight bridge and having a ratio pan suspended therefrom and slidable relative thereto, a dial indicator comprising an inner dial chart and an outer dial chart and an indicating needle, means linking the indicating needle of said dial indicator to said trolley frame and including a rack fixed to a spring plate spring hung from said dial indicator and connected to said trolley frame, the rack of said linking means being engageable with a pinion integral with the indicating needle of said dial indicator and being movable as said trolley frame is moved whereby the total weight of articles placed on said weight bridge may be determined by reference to the outer dial chart of said dial indicator and whereby the number of articles placed on said weight bridge above or below a certain total may be determined by reference to the outer dial chart of said dial indicator by placing a certain number of the articles in said ratio pan, and sliding said ratio pan longitudinally along said counting beam in a certain direction with the average weight of articles placed on said weight bridge being indicated on said inner dial chart by placing a certain number of the articles in said ratio pan and sliding said ratio pan longitudinally along said counting beam in a direction opposite to the said certain direction.

References Cited in the file of this patent

UNITED STATES PATENTS

| | | |
|---|---|---|
| 852,281 | Milburn | Apr. 30, 1907 |
| 1,161,009 | Ruckes | Nov. 16, 1915 |
| 1,330,593 | King | Feb. 10, 1920 |
| 1,451,403 | Osgood | Apr. 10, 1923 |
| 1,848,584 | Sykes | Mar. 8, 1932 |
| 2,072,436 | Von Pein | Mar. 2, 1937 |